Feb. 6, 1968     G. R. WEBSTER     3,367,183

APPARATUS FOR MEASURING LIQUID LEVELS

Filed May 19, 1964

INVENTOR

George R. Webster

BY Emery, Whittemore,
Sandoe & Graham

ATTORNEYS.

United States Patent Office 3,367,183
Patented Feb. 6, 1968

3,367,183
APPARATUS FOR MEASURING LIQUID LEVELS
George R. Webster, Princeton, N.J., assignor to Pyrofax Gas Corporation, New York, N.Y., a corporation of Delaware
Continuation-in-part of application Ser. No. 43,880, July 19, 1960. This application May 19, 1964, Ser. No. 368,650
7 Claims. (Cl. 73—304)

This application is a continuation-in-part of my application Ser. No. 43,880, filed July 19, 1960, now abandoned.

This invention relates to apparatus for conveniently measuring the level of liquid in a closed tank.

Many of the conventional devices for measuring the level of liquid in a tank are hazardous with tanks containing inflammable liquid under pressure. Mechanical gauges have proved unreliable. Sight glasses are too dangerous because of possible breakage. Devices which utilize the escape of some of the contents into the atmosphere are not safe with liquefied fuel gases such as propane.

The liquid level of closed tanks, including fuel tanks, has been measured by means of condenser elements which are elongated and positioned substantially vertically in the tank so that the extent to which the elements are submerged varies with the amount of liquid in the tank. The liquid is the dielectric between the parts of the condenser elements that are submerged and the vapor of the liquid is the dielectric between the parts of the condenser elements above the liquid. Since the dielectric constant of the liquid is different from that of the vapor, it is possible to determine the depth of liquid by measuring the change in capacity of the condenser.

It is an object of this invention to provide improved apparatus utilizing the variable condenser principle for determining the amount of liquid in a closed tank.

Another object is to provide apparatus by which the amount of liquid in tanks at different places can be determined with a portable detector which can be carried from place to place and utilized with the different tanks and without requiring calibration of the detector for the different tanks. This new result is attained by a construction which avoids the influence of stray capacity which is likely to be different at every tank.

Features of the invention relate to a construction for making adjustments of individual units to compensate for manufacturing tolerances and minor differences in tanks; to apparatus for getting quick readings conveniently at different tanks; and to protection of the contents.

Other objects, features and advantages of the invention will appear or be pointed out as the description proceeds.

In the drawing, forming a part hereof, in which like reference characters indicate corresponding parts in all the views.

The invention provides an improved type of liquid-measuring device for use in a liquid-containing receptacle which includes a tank for holding a supply of the liquid such as liquefied petroleum gas to be measured, a variable capacitance probe associated with the tank and extending therein, and a portable electrical measuring means for connection with an externally-protruding portion of the probe to detect the capacitance thereof in accordance with the length to which said elements extend beneath the surface of the contained liquid.

Figure 1:
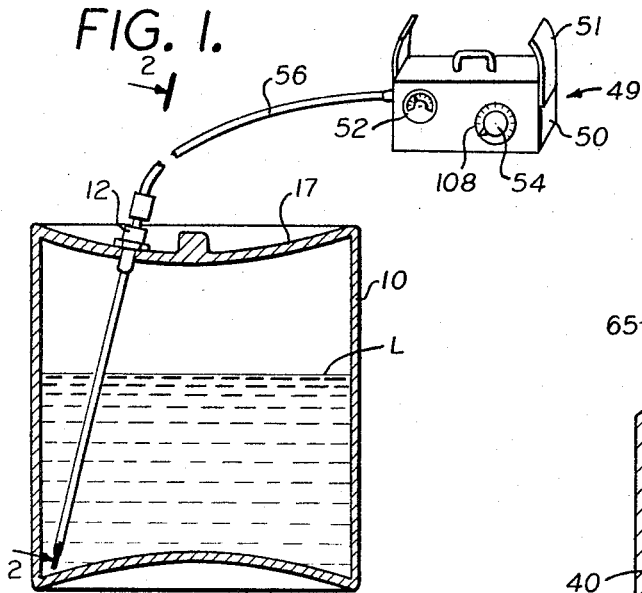
FIGURE 1 is a vertical sectional view showing a tank equipped with apparatus for measuring the depth of liquid in accordance with this invention.

FIGURE 1 shows an apparatus in which the invention may be utilized consisting of a tank 10 for storing a supply of a liquid, or liquefiable substance such as propane gas. Normally, a tank of this nature is filled with the liquefied gas to a level near the top. Thereafter, as the material is drawn off, continuous vaporization of the liquid maintains a certain pressure level in the vapor space above the liquid, which bears against the liquid surface L. An elongated probe assembly 12, engaged in the tank head, extends downwardly with its lower end terminating immediately above the tank floor so that a portion of the probe is always submerged in the remaining liquid.

Figure 2:
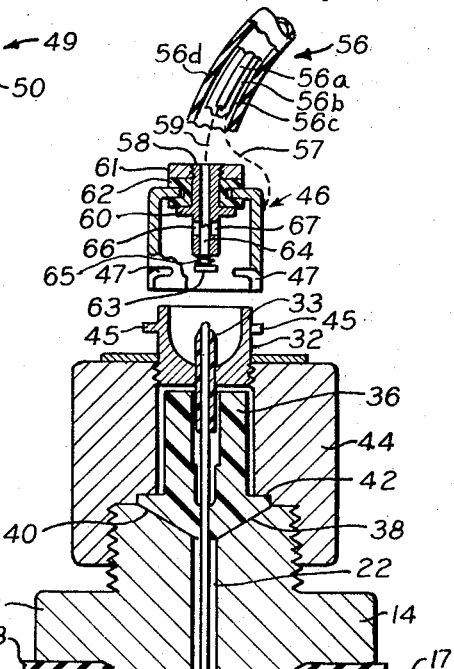
FIGURE 2 is an enlarged sectional view taken on the line 2—2 of FIGURE 1.

Referring to FIGURE 2, a preferred embodiment of the probe assembly consists of an elongated nipple 14 preferably made of an electrically-conductive metal such as brass. A lower cylindrical portion 16 of the nipple is threaded for engaging a mating port formed into the tank head 17. In order that a sufficiently pressure-tight fit may be obtained, a resilient gasket 18 may be compressed between the tank outer surface, and a protruding shoulder 20 on the nipple circumference. This expedient is unnecessary if a gas-tight threaded joint is provided, or if low pressure exists in the tank. While the figures illustrate the nipple as being fastened in the tank head 17 so that the condenser elements are disposed in a substantially vertical direction, it is understood that the probe assembly may be readily inserted into the tank wall at any convenient spot so long as the elements are normally dispossed to contact the liquid and respond to liquid level changes within the tank.

An axial bore 22, terminating at the nipple lower surface, communicates with the tank interior and with one of the condenser elements 24 which may be an elongated tube positioned adjacent the bore 22 and fastened to the nipple 14 in such a manner that the said element, when properly positioned, is normally in a substantially vertical disposition within the tank. While the respective element and nipple are preferably joined by soldering or welding, such a fused joint is not essential so long as the two parts are maintained in sufficient electrical contact with the tank to form a part of the electrical ground circuit to be hereinafter described.

The element 24, which will hereinafter be referred to for convenience as a tube, is preferably open at the lower end to permit free vertical movement of the contained liquid as the level varies; apertures or openings 25 may also be provided along the tube length to accommodate the liquid flow. In order that the rising liquid will be prevented from entrapping air or vapor within the tube as the liquid level rises, or conversely, draw a vacuum when the liquid level decreases, at least one opening 25 is provided at the tube upper end, adjacent the tank head 17.

In order to avoid deterioration of the exposed parts, due to contained corrosive vapors in the tank, the tube 24 is preferably made of an electrically-conductive, corrosion-resistant metal such as brass, or aluminum. Also, while we have herein referred to this condenser element 24 as a tube, no such limitation is intended. For instance, the elements may readily take the form of a series of strips, or a single element having a non-tubular cross section, so long as there is provided the necessary spacing for the dielectric material to pass freely between them. The primary advantage of the present circular cross-sectional embodiment of the tube 24 lies in the fact that a greater degree of uniformity in spacing is possible, resulting in a more uniform rate of capacitance differential as the liquid level changes.

A second condenser element or conductor 28 is fixedly positioned within the tube 24, extending substantially the length thereof with an annular spacing or passage 30, through which the dielectric fluid may vertically rise and fall. This second member is essentially a metallic conductor having the upper end extending through a suitable socket terminal piece 32 for connection into the measuring meter circuit. A sleeve 33 of electrical insulating plastic material holds the element 28 centered in the opening through which it passes in the terminal piece 32. It has been found that the element 28 may take the form of a rod, or a length of insulated wire having sufficient gauge to maintain a degree of rigidity. For instance, with an outer tube 24 having an inside diameter of approximately 0.132 inch, the inner element may consist of a strand of #10 or #11 single conductor magnet wire having a thin insulation coating, and this provides a condenser within an operable range of the present meter circuit, as will be herein noted.

The upper end of element 28 is centered in the bore 22 and compressively retained by a resilient packing sleeve 36 of electrically-insulating plastic. This sleeve comprises a generally-cylindrical member having an axial opening of sufficient diameter slideably to receive the conductor element 28 prior to being compressively assembled. A frusto-conical forward face 38 on the sleeve is conformed to sealably engage a similarly contoured frusto-conical seat 40 on the nipple upper surface when said members are brought into abutting engagement. A circumferential protruding shoulder 42 provides an abutment for a ring nut 44 which threadably engages an upper cylindrical portion of the nipple whereby rotation of the nut will tend to compressibly urge the sleeve forward face into the seat 40. Radial pressure exerted on the frusto-conical face, as a result of such downward urging, is sufficient to laterally compress the resilient sleeve and collapse the axial opening, thereby forming a gas-tight annular seal about the conductor.

In accordance with the invention, to provide both resiliency and corrosion-resistant qualities, the sleeve is preferably fabricated of a chemically-resistant and heat-resistant non-metallic plastic such as Teflon or nylon; this material also electrically insulates the conductor element from the associated probe members. Another pertinent advantage of the discloses sealing means lies in the ease with which the conductor length may be adjusted to achieve a particular capacitive value. For instance, in order that a single electrical measuring circuit may be calibrated and used on a large number of propane tanks, each individual probe should be maintained to some degree of uniformity within a desired range.

It has been found that for a condenser probe assembly having a length of about 36 inches, a desirable capacitance lies within the range of from about 200 to about 600 micro-micro farads. It is understandable in this respect that if the length of the tube 24 is maintained relatively constant, the length of conductor 28 may be suitably adjusted on each individual unit by vertical manipulation through the sleeve 36 to achieve the necessary capacitive value. When properly positioned, the conductor 28 is held in place by tightening the nut 44.

The terminal piece 32 has studs 45 (FIGURE 2) projecting from it on opposite sides. A connector 46 fits over the terminal piece 32 and has bayonet slots 47 which engage the studs 45 and which lock the connector to the terminal piece 32 when the connector 46 is turned to bring the studs 45 into the horizontal portions of the bayonet slots 47.

A measuring device 49, as shown in FIGURE 1, comprises a relatively small and light-weight unit preferably contained in a box 50 having a convenient carrying strap or handle 51 for maximum portability. The meter includes an externally-visible ammeter face 52 which may be manually adjusted to a predetermined position by a protruding pointer knob 54. With the ammeter needle properly set, the pointer will indicate on a calibrated scale 108 the exact status of the contents of the tank. The scale may read directly in gallons or may indicate some code number which is multiplied by a known factor to determine the actual contents of the tank. A flexible electric cable 56 extends from the measuring device 49 to the connector 46.

The cable 56 includes a center conductor 56a surrounded by insulation 56b which holds the conductor 56a centered in a tubular conductor 56c. The tubular conductor is surrounded by other outside insulation 56d. Thus the cable 56 is a coaxial cable.

The tubular conductor 56c is attached to the connector 46, the connection being indicated diagrammatically by the dotted lines 57. Thus, when the connector 46 is attached to the terminal piece 32 by the bayonet connection consisting of the studs 45 and the bayonet slots 47, the tubular conductor 56c is connected with the terminal piece 32 and through the terminal piece to the nut 44, nipple 14 and the top 17 of the tank 10.

The center conductor 56a is connected into the top of a fitting 58 by a connection illustrated diagrammatically by the dotted line 59. The fitting 58 extends through the top wall of the connector 46. It has an integral collar 60 and the upper end of the fitting 58 has threads for receiving a clamping nut 61. The fitting is clamped in place by the collar 60 and clamping nut 61; there being a grommet 62 made of electrical insulating material for keeping the fitting 58, collar 60 and nut 61 from touching the connector 46.

There is a hollow axial bore through the fitting 58 and a movable contact 63, located below the end of the fitting 58, has a stem 64 which slides freely in this axial bore. The contact 63 is urged downwardly by a helical compression spring 65, but its downward movement is limited by a pin 66 extending through the stem 64 and into a slot 67 in the side wall of the fitting 58.

The fitting 58 is of such length, with respect to the connector 46, that the movable contacts 63 touch the upper end of the condenser element or conductor 28 in the terminal piece 32 before the studs 45 reach the top of the slots 47. Further downward movement of the connector 46 over the terminal piece 32 causes the movable contact 63 to move upward as the stem 64 slides in the axial bore in the fitting 58. The movable contact 63 and its stem 64 have enough vertical movement to permit the connector 46 to be brought down into position to lock it on the terminal piece 32. Thus, the center conductor 56a of the cable 56 is connected through the fitting 58 and movable contact 63 with the condenser element or conductor 28.

To determine the capacitive value of the immersed or partly immersed probe at a particular fluid level, any of several detector circuits may be employed. As shown in the schematic drawing of FIGURE 3, I utilize the substitution principle in which the measuring circuit is tuned for a set frequency, and a variable capacitance in the circuit is then adjusted to maintain a constant load. The measuring circuit itself comprises two major portions, i.e., a tuned oscillator circuit which is capacitively coupled to a tank circuit, the latter providing a load for the former. Normally, the oscillator circuit is fixedly tuned to a predetermined frequency, after which the tank circuit is brought into resonant frequency which condition will be indicated by a maximum current in the tuned circuit.

Figure 3:
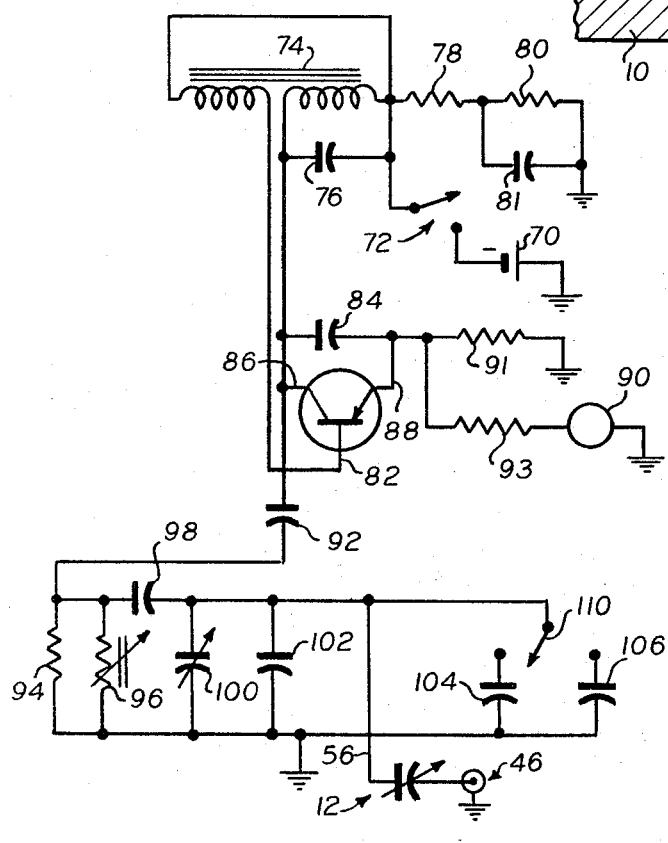
FIGURE 3 is a schematic circuit diagram for the apparatus shown in FIGURE 1.

Referring to FIGURE 3, the oscillator circuit components include a direct-current power supply such as a battery 70, controlled by an ON-OFF switch 72. An R.F. tuning coil 74, connected in parallel with a condenser 76, is tuned to a frequency which is not critical to the invention but which may be within the range of about 450 to 550 kc. Resistors 78 and 80, together with a condenser 81 connected in parallel with resistor 80, provide a bleeder network for by-passing R.F. and avoiding feedback to the tuner. A transistor 82 serves as the amplifying element in the illustrated collector feedback to base connection, and is of a well-known configuration to control the degree of loading on the oscillator circuit. A condenser 84 connected across the transistor collector 86, and emitter 88 terminals, furnishes an R.F. by-pass The ammeter 90 is connected to ground and mounted as mentioned with the face outwardly visible on the meter box to provide an indication of the degree of resonance of the circuit as determined by the oscillator circuit current. Resistors 91 and 93 function as biasing components.

The tank circuit is coupled into the oscillator circuit through coupling condenser 92; the resistor 94 serves as a de-sensitiziing element for protection of the circuit in the event the dielectric material between the condenser probe plates is a material other than propane. A variable R.F. coil 96, a condenser 98, and a variable condenser 100 provide the tuning means for adjusting the tank circuit into resonance with the oscillator circuit. As seen in FIGURE 3, the condenser probe 12 is connected into the tank circuit between ground, and one terminal of condenser 102. It is therefore seen that condensers 100 and 102 supplement each other in the tuning function such that any capacitance value in the latter, due to a particular liquid level, will detune the tank circuit and resonance may only be re-established by a compensating adjustment of condenser 100. This condenser 100 is disposed in the meter box with the rotatable shaft protruding through a wall thereof, which shaft is adapted to accommodate the hereinmentioned pointer knob 54 such that adjustment of the condenser 100 to establish a maximum reading on ammeter 90 will be registered on the calibrated dial plate 108.

The tank circuit is also provided with means for calibrating the instrument which consists of condensers 104 and 106 connected in parallel to the tank oscillator and separately insertable in the circuit by a switch 110. As previously mentioned, the variable probe condenser is so constructed to be characterized by capacitance values within the range of about 200 and 600 micro-micro farads when the tank is respectively at empty and full conditions. All of the circuit shown in FIGURE 3 is part of the measuring device 49 except the probe assembly 12.

For properly calibrating the tank circuit, the probe is disconnected, the switch 110 is set to insert condenser 106 into the tank circuit, and the condenser 100 is then sufficiently adjusted to indicate resonance on the ammeter 90. In such condition, the dial plate 108 may be provided with the appropriate marking in accordance with the position of pointer knob 54. Similarly, to calibrate for full tank condition, the probe assembly is removed from the circuit and the 600 micro-micro farad condenser 104, is substituted through switch 110. As before, the condenser 100 is again adjusted for a maximum reading on ammeter 90 and the dial plate marked accordingly. Theoretically, the probe capacitance will vary at a uniform rate in response to the degree of immersion in the liquid so that the scale calibration intermediate "empty" and "full" may be marked accordingly.

Figure 4:
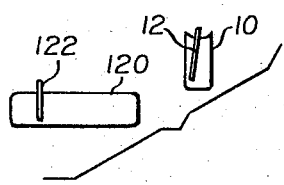
FIGURE 4 is a diagrammatic view illustrating the application of the invention to tanks of different shape.

FIGURE 4 shows the tank 10 with the probe 12 and also shows another tank 120 with a probe 122. The capacity of the tank 120 is much larger than the capacity of the tank 10 but because of the fact that the tank 120 is wide and long but not so high as the tank 10, the variation in the liquid level is less than in the tank 10 even though the variation in the actual contents is much greater.

In order to be able to use the same measuring device 49 with the probe 122 as with the probe 12, the probe 12 is constructed with different area for the condenser elements and/or with different spacing between the condenser elements so that its capacity when the tank 120 is empty is the same as the capacity of the probe 12 when the tank 10 is empty; and the capacity of the probe 122 is the same when the tank 120 is full as is the capacity of the probe 12 when the tank 10 is full.

This result is easily accomplished by changing the areas and/or spacing of the condenser elements of the probe 122 as compared with that of the probe 12; but even though the changes in the capacity are the same as the liquid level varies in the tanks 10 and 120, the actual contents of the tanks for the different levels are not the same. For this reason it is advisable to have the scale 108 of the measuring device graduated in units, between full and empty, which are to be multiplied by a constant to determine the actual content of any particular tank. The constant used will, of course, be different for the tank 10 than for the tank 120, but each tank can be marked with the constant which is to be used with the measuring device 49 to convert the reading of the scale 108 to gallons or other units in which the contents of the tank are to be measured.

It is apparent from the foregoing description that this invention provides a simple means of quickly taking readings on a number of propane tanks in a very short time. Aside from connecting and disconnecting the connector 46 and the terminal piece 32, it is only necessary to make a single adjustment by manipulation of the pointer dial knob 54 to obtain a proper reading. Also, the novel probe construction lends itself readily to replacement or substitution of the conductor element should such become necessary.

The preferred embodiment of the invention has been illustrated and described, but changes and modifications can be made and some features can be used in different combinations without departing from the invention as defined in the claim.

What is claimed is:

1. Apparatus for measuring the level of a liquid, possessing dielectric properties, in a plurality of tanks including tanks at widely separated locations, a variable capacitance probe extending through an upper part of each tank and downwardly in the tank for immersion in liquid stored within the tank, the probe including two closely spaced condenser elements, a fitting at the upper end of the tank and including a connector to which the condenser elements are connected, a portable measuring device comprising an electric circuit and indicating means in the circuit for measuring the capacitance of the probe at each tank, the electric circuit including two conductors and a connector to which said conductors connect and which is complementary to the connector on each tank for connecting the measuring device with each probe, the fitting at the upper end of each tank including a nipple that screws into a side of the tank and to the inner end of which one of the condenser elements is connected, a clamping nut that fits over the outer end of the nipple, a resilient sleeve that is within the clamping nut and surrounding an upper part of the other condenser element that extends through and beyond the upper end of the nipple, said other condenser element being electrically insulated from the nipple and clamping nut, a terminal piece connected to the clamping nut and constituting a part of the connector on the tank for connecting the probe with the measuring device, the terminal piece having a socket in its upper end and into which the upper of said other condenser element extends to form another part of the connector on the tank for connecting the probe with the measuring device, the terminal piece having studs on its outside surface for a bayonet lock, and the connector for the measuring device fitting over the terminal piece and having grooves that engage the studs to secure the connectors together, the connector for the measuring device having a resilient center contact in position to touch said other condenser element of the probe when the connectors are assembled with one another, and a flexible electric cable connecting the measuring device with its connector.

2. Apparatus for measuring the level of a liquid, possessing dielectric properties, in a plurality of tanks including tanks at widely separated locations, a capacitance probe extending through an upper part of each tank and downwardly in the tank for immersion in liquid stored within the tank, the probe including two closely spaced condenser elements in the tank, a fitting at the upper end of the tank and including a connector to which the condenser elements are electrically connected, the individual probes in the different tanks being of a capacity that varies with the depth of the liquid in the tanks, the probes in the respective tanks being constructed and arranged to record the same capacitance on the measuring device for equal percentages to which the tanks are filled with liquid, a portable measuring device comprising a variable condenser for connection in the circuit of said condenser elements and movable to compensate changes in the capacitance of the probe for indicating changes in the liquid level in the tank, an electric circuit and indicating means in the circuit for indicating current flow when connected with the probe at each tank, the electric circuit including two conductors and a connector to which said conductors connect and which is complementary to the connector on each tank for connecting the measuring device with each probe, all parts that are movably adjustable for obtaining indications of liquid level changes being part of the portable measuring device.

3. The apparatus described in claim 2 characterized by means for adjusting the capacitance of the probe of each tank to compensate local conditions and to obtain substantially uniform capacitance for the probes at the different tanks when the liquid in the tanks are at corresponding levels.

4. The apparatus described in claim 2 characterized by one of the condenser elements of the probe being a rod and the other a tube surrounding the rod and substantially concentric therewith, clamping means for preventing relative axial movement of the rod and tube, the clamping means being releasable for permitting adjustment of the rod and tube to change the capacitance of the probe to compensate for local conditions at a particular tank installation.

5. The apparatus described in claim 2 characterized by the fitting at the upper end of each tank including a nipple that screws into a side of the tank and to the inner end of which one of the condenser elements is connected, a clamping nut that fits over the outer end of the nipple, a resilient sleeve that is within the clamping nut and surrounding an upper part of the other condenser element that extends through and beyond the upper end of the nipple, said other condenser element being electrically insulated from the nipple and clamping nut.

6. The apparatus described in claim 5 characterized by a terminal piece connected to the clamping nut and constituting a part of the connector on the tank for connecting the probe with the measuring device.

7. The apparatus described in claim 6 characterized by the terminal piece having a socket in its upper end and into which the upper of said other condenser element extends to form another part of the connector on the tank for connecting the probe with the measuring device.

References Cited

UNITED STATES PATENTS

| | | | |
|---|---|---|---|
| 2,477,511 | 7/1949 | Comb | 73—304 X |
| 2,622,442 | 12/1952 | Boisblanc et al. | 73—304 |
| 2,742,609 | 4/1956 | Black et al. | 73—304 X |

LOUIS R. PRINCE, *Primary Examiner.*

S. CLEMENT SWISHER, *Assistant Examiner.*